United States Patent [19]

Zemany et al.

[11] Patent Number: 4,791,573
[45] Date of Patent: Dec. 13, 1988

[54] STATE-DEVIATION-ESTIMATION CIRCUIT EMPLOYING A PHASE-LOCKED-LOOP PHASE REFERENCE

[75] Inventors: Paul D. Zemany, Amherst; Kirby A. Smith, Derry, both of N.H.; John A. Smith, Bedford, Mass.

[73] Assignee: Sanders Associates, Inc., Nashua, N.H.

[21] Appl. No.: 902,815

[22] Filed: Sep. 2, 1986

[51] Int. Cl.$^4$ .................. G05D 1/08; B64G 1/28; B64G 1/36
[52] U.S. Cl. .................. 364/454; 244/3.20; 244/3.21; 364/453; 364/459
[58] Field of Search .................. 364/453, 454, 459; 244/3.2, 3.21

[56] References Cited
U.S. PATENT DOCUMENTS

| 4,012,018 | 3/1977 | Lorell et al. | 364/454 X |
| 4,114,841 | 9/1978 | Muhlfelder et al. | 364/459 X |
| 4,222,272 | 9/1980 | Mairson | 364/453 X |
| 4,370,716 | 1/1983 | Amieux | 364/459 X |
| 4,617,634 | 10/1986 | Izumida et al. | 364/453 X |

Primary Examiner—Felix D. Gruber
Attorney, Agent, or Firm—Richard I. Seligman

[57] ABSTRACT

A system (34) for determining deviations in the state of motion of a projectile (10) from its intended state includes a comparison module (38) that receives the outputs S of a sensor array (36). The comparison module (38) converts the sensor outputs to a measurement vector $Z_m$ and computes the deviation of this measurement vector from an intended measurement vector $Z_0$ received from a control system. The comparison module (38) then determines the difference $E_Z$ between this measured deviation and the deviation predicted by a Kalman filter (44, 46). In generating the measurement vector $Z_m$ from the outputs of the sensor array (36), the comparison module (38) "de-spins" the array outputs in accordance with the output of a phase reference (42), whose purpose is to indicate the phase with respect to gravity of the spin of the projectile (10) about its longitudinal axis. The Kalman filter's state-deviation estimator (46) weights the vector output of the comparison module (36) and adds it to the output of the Kalman filter's state-deviation predictor (44) to provide an updated state-deviation estimation $E_X(t{:}t)$, which the state-deviation predictor (44) then uses as a basis for its next cycle. The output of the comparison module (38) constitutes a measure of the performance of the state-deviation predictor (44) and is used as a correction factor for the phase reference (42) so that the system acts as a phase-locked loop to lock the phase reference (42) onto the projectile spin without the need for an external sensor to determine the direction of gravity.

28 Claims, 4 Drawing Sheets

STATE-DEVIATION-ESTIMATION CIRCUIT EMPLOYING A PHASE-LOCKED-LOOP PHASE REFERENCE

BACKGROUND OF THE INVENTION

The present invention is directed to devices for determining the state of motion of a platform that is moving under the influence of gravity. It has particular application to the control of spin-stabilized projectiles.

Projectiles that are to be controlled after firing need to include some sort of mechanism to determine changes in the state of motion of the projectile. In the case of projectiles that are spin-stabilized—that is, in the case of projectiles that are spinning about an axis directed roughly in the direction of motion—sensor outputs have to be mathematically "de-spun" in order to allow the motion determination to be made in an inertial reference frame.

One type of motion-sensing mechanism that has been employed in the past uses an array of accelerometers and employs state-estimation techniques to transform the accelerometer outputs into the motion-state variables. In order to transform the accelerometer outputs accurately, the orientation of the spinning projectile with respect to gravity—which can be thought of as the phase of its spin—must be determined. In the past, this determination has typically been made by employing a device such as a sun sensor for determining which way is up.

Clearly, the use of such a sensor introduces additional mechanical complexity and requires that the sun be visible. Furthermore, it makes it necessary for the system to be supplied with latitude, longitude, and time-of-day information.

An object of the present invention is to permit motion sensing of spin-stabilized projectiles and similar platforms without the use of an external reference to determine the spin phase of the platform.

SUMMARY OF THE INVENTION

The foregoing and related objects are achieved in a state-deviation-estimation system that employs a phase-locked-loop arrangement to determine the vertical direction. With the exception of the phase-locked-loop feedback path, most of the elements of the system are similar to those used in some prior-art error-estimation systems.

Such systems are used as parts of control systems such as those for controlling the control surface of the projectile. The control system sends the deviation-estimation system a target-vector signal that represents intended values that certain kinematic variables will assume if the direction of the projectile is changing in exactly the commanded fashion. The deviation-estimation system includes a sensor array and assesses the sensor outputs to determine the deviation of the actual state variables from their intended values. This deviation is used by the control system to compute the necessary control signals.

The output of the sensor array is typically very noisy, and such prior-art systems often filter out much of this noise by using a Kalman filter, which includes, among other things, a deviation predictor that employs a mathematical model of the platform to calculate a predicted state deviation from a previously estimated state deviation. A difference means generates a difference output representing the difference between (i) the kinematic variables as derived from the sensor array in accordance with a phase reference and (ii) the kinematic variables as derived from the deviation predicted by the state-deviation predictor. The final stage of the filter produces as the system output a vector that can be described as the output of the state-error estimator adjusted in accordance with the output of the difference means weighted in a manner that reflects the expected relative accuracies of the mathematical model and the sensor output.

The present invention is similar to such prior-art systems, but it differs from them in that such systems usually require some type of additional sensor, such as a sun sensor, to align the phase reference with the vertical. In contrast, the present invention employs a phase-locked loop. Specifically, the phase-reference source of the present invention generates the phase reference on the basis of an assumed spin frequency, and it adjusts the assumed spin frequency in accordance with the output of the difference means so as to reduce those components of the difference-means output that are symptomatic of a phase error. In this way, the phase reference is properly aligned with gravity without using a sun sensor.

BRIEF DESCRIPTION OF THE DRAWINGS

These and further features and advantages of the present invention are described in connection with the accompanying drawings, in which.

DETAILED DESCRIPTION OF THE PREFERRED EMBODIMENTS

Figure 1:
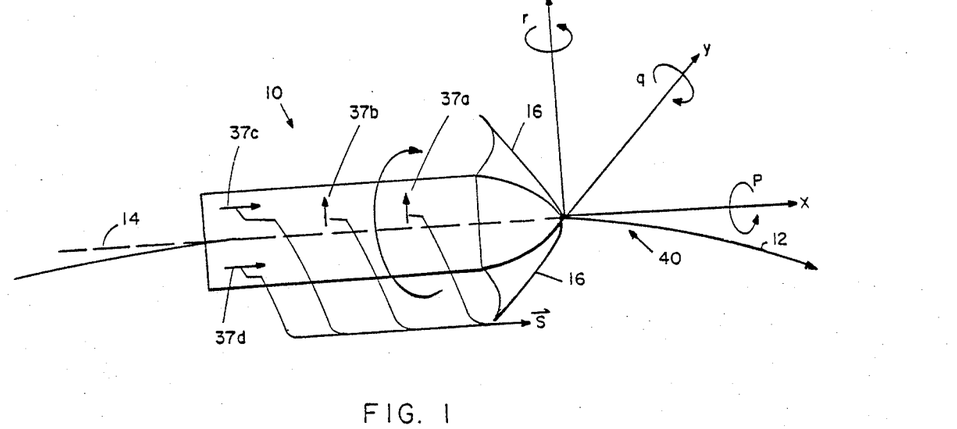
FIG. 1 is a simplified diagram of a projectile that employs the deviation-estimation system of the present invention.

The deviation-estimation system of the present invention may be employed in connection with a platform such as a spinning projectile 10 of FIG. 1. Projectile 10 follows a trajectory 12 and spins about its longitudinal spin axis 14, which is shown as aligned with the trajectory 12. Although the spin axis 14 is ordinarily aligned roughly with the trajectory 12, it actually executes complicated motion—i.e., precession and nutation—about that trajectory.

Figure 2:
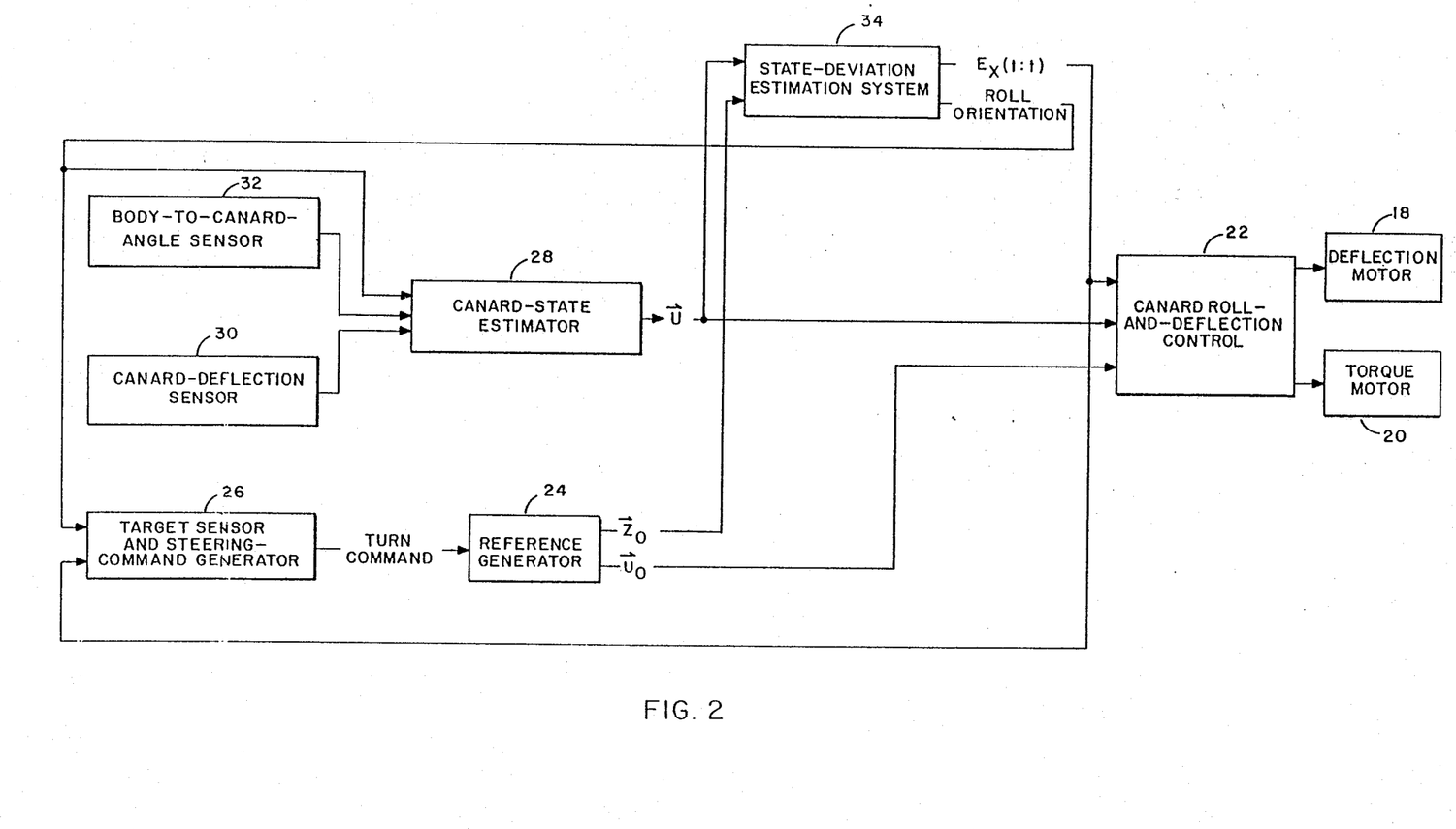
FIG. 2 is a block diagram of a control system of which the system of the present invention is a part.

The projectile 10 is provided with canards 16, which are controllable to cause the projectile to veer from a simple aeroballistic path so as to allow it to be guided to its target. The canards are also used to reduce precession and nutation. The environment in which the deviation-estimation system of the present invention is used is a control system, depicted in FIG. 2, for causing the projectile to respond to commands that guide it in a particular direction. The canards 16 are controlled by a deflection motor 18 and a torque motor 20, which in turn respond to torque and deflection commands from a roll- and-deflection module 22. Module 22 derives the proper roll and deflection from input vectors $E_x$, $U_0$, and U. $E_x$ represents the difference between the actual and intended values of four translational and rotational speeds of the projectile. $U_0$ represents the intended state of the canards, and U represents their actual state.

A reference generator 24 generates $U_0$ from a turn command that represents the turn necessary to direct the projectile to a detected target. A target sensor and steering-command generator 26 detects the target, determines the difference between the current direction and the direction required to reach the target, and generates the turn command from the detected difference and from information concerning the spin orientation and current state error of the projectile. From this turn command, the reference generator 24 additionally generates a $Z_0$ vector, which represents the values that certain kinematic variables will assume if the projectile exactly executes the commanded turn. Specifically, $Z_0$ is the intended value of a measurement vector Z, whose elements are: b, which is the acceleration along the horizontal y-axis of the reference frame 28; c, which is the acceleration along the z-axis; q, which is the angular velocity about the y axis, i.e., the pitch rate; and r, which is the angular velocity about the z-axis, i.e., the yaw rate.

A canard-state estimator 28 generates the estimate U of the actual canard state from the outputs of angle sensors 30 and 32, which sense the canard deflection and the angle of the canards with respect to the body of the projectile. In generating U, the canard-state estimator uses an indication of the projectile roll orientation, which it obtains from the state-deviation-estimation system 34 of the present invention. The basic purpose of the deviation-estimation system 34 is to use $Z_0$, U, and motion-sensing apparatus to generate a vector $E_x$ that represents the difference between the intended and actual states X of the projectile. The elements of the state vector X are the quantities v, w, q, and r, which are the projectile's translational speeds along the y- and z-axes and its angular speeds about those axes. As FIG. 2 indicates, however, it also supplies certain of the elements of the control system with an indication of the roll orientation of the projectile. The manner in which the other elements of the control system use the indications of state deviation and of roll orientation are conventional and will not be discussed further here. The remainder of the specification will instead be directed to the operation of the deviation-estimation system 34 of the present invention.

Figure 3:
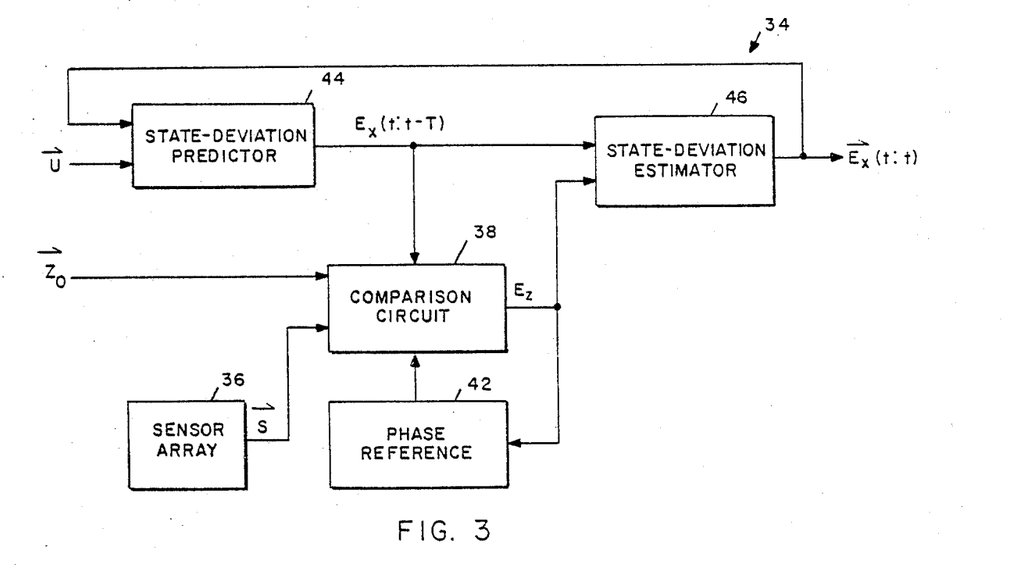
FIG. 3 is a block diagram of the deviation-estimation feature of the present invention.

FIG. 3 depicts the deviation-estimation system 34 of the present invention in block-diagram form. Most or all of the computations in a typical implementation would actually be performed by a single microprocessor, so the blocks in the block diagram represent, for that embodiment, modules of the program under which the microprocessor would run. Clearly, however, the same functions could be embodied in separate circuits. The error-estimation system 34 includes a sensor array 36, which can consist of any group of sensors that senses enough kinematic variables to determine changes in the state of motion of the projectile 10. For example, the sensors can be a group of accelerometers positioned in the body of the projectile, as FIG. 1 illustrates. Specifically, FIG. 1 represents four accelerometers $37a$–$d$ by arrows showing their positions and sensitive axes. Accelerometers $37a$ and $37b$ are disposed on the spin axis 14 of the projectile 10 and are sensitive to accelerations perpendicular to the spin axis in a plane that spins with the projectile 10. If the projectile 10 were fixed in a horizontal orientation and were spinning about its axis, accelerometers $37a$ and $37b$ would sense only the force of gravity, which, because of the spinning of the projectile 10, would cause these accelerometers to produce sinusoidal signals. For a typical projectile traveling in a ballistic path, the accelerometer outputs do not respond to gravity so directly, but they do respond to turns caused by gravity and so include information indicating the orientation of the projectile 10 with respect to gravity. The two further accelerometers $37c$ and $37d$ are spaced from the spin axis on opposite sides thereof and are sensitive to acceleration parallel to the spin axis.

The outputs of all of these accelerometers $37a$–$d$ are referred to here collectively as the vector quantity S. The output S of the sensor array 36 is fed to a comparison circuit 38, as is the target measurement vector $Z_0$. The comparison circuit 26 makes a comparison between $Z_0$ and a measurement vector $Z_m$ derived from S.

The sensors are in a spinning reference frame, while vectors $Z_0$ and $Z_m$ represent quantities referenced to a "de-spun" coordinate system—i.e., a coordinate system that travels with the projectile 10 and is aligned with the projectile's trajectory but does not spin. FIG. 1 depicts such a coordinate system 40. The coordinate system 40 includes an x-axis that is aligned with the trajectory 12. Stated another way, the x-axis is aligned with the position that the spin axis would take if the projectile were in complete trim—i.e., if there were no precession or nutation of the projectile about the trajectory. The y-axis is a horizontal axis perpendicular to the x-axis, and the z-axis is the axis perpendicular to both of the other axes.

In order to derive $Z_m$ from S, the quantities comprising S must be mathematically "de-spun" into coordinate system 40. (In the alternative, the quantities derived from $Z_0$ can be "spun.") To provide this de-spinning, a phase reference 42 supplies the comparison circuit 38 with a signal that represents the orientation with respect to gravity of the projectile 10 about its spin axis.

$Z_m$ is the value of Z derived from S. $Z_0$ is the value that the vector measurement $Z_m$ would have if the projectile were completely in trim and changing its direction of motion at the correct rate. Comparison of $Z_m$ with $Z_0$ gives the deviation of the measured value of Z from its target value, and the output $E_Z$ of the comparison circuit 38 is the difference between this measured deviation and a deviation derived from a state deviation predicted by a state-deviation predictor 44. The state-deviation predictor 44 and a state-deviation estimator 46 together form what is commonly known as a Kalman filter, which is used here as it is in some prior-art systems, to generate state-deviation signals from sensor outputs. The Kalman filter determines the state deviation by using a mathematical model, which is relatively accurate but may have a long-term error, and the sensor output, which is relatively noisy but whose noise tends to have no d.c. value; that is, its noise becomes small in comparison to the signal in an average over time. The Kalman filter combines the model-derived deviation with the sensor-derived deviation by adding to the model-derived deviation a low-weighted fraction of the difference between the model- and sensor-derived values. This tends to eliminate the long-term errors in the model without passing through the short-term errors from the sensors.

The state-deviation predictor 44 employs a linearized perturbation model of the projectile system to predict, on the basis of the forcing function U and the previously estimated state deviation, what the next state deviation will be. This model takes into account gravity and other factors that result in precession and nutation, and the predicted error resulting from this model is denoted by $E_x(t:t-T)$, which is the deviation in the state vector X at time t predicted in accordance with sensor data taken up through time t-T, where T is the projected revolution period. $E_x(t:t-T)$, the output of the deviation predictor 44, is stated in the same terms as the state vector X rather than in terms of the measurement vector Z, so the comparison circuit 38 derives a predicted deviation in Z from this predicted deviation in X, and it subtracts the predicted Z deviation from the difference between $Z_0$ and $Z_m$ to produce $E_Z$, which is an indication of the difference between the actual and mathematically predicted deviations. Although $E_Z$ is typically noisy so that none of its individual values indicates this difference reliably, its average over time has components that are a good indication of bias in the mathematical model. $E_Z$ can thus be used as a performance measure, as will be described more fully below.

The comparison module 38 applies $E_Z$ to the state-deviation estimator 46, which transforms it into a weighted change in the state deviation and adds the result to the predicted state deviation $E_X(t:t-T)$. The result $E_X(t:t)$ is the deviation of the projectile state from totally tfimmed flight in the commanded direction.

Functions described so far are performed by certain prior-art systems. However, such systems ordinarily include some type of additional sensor, such as a sun sensor, in the phase reference 42 to enable it to give a proper indication of the direction of gravity. The present invention requires no such additional sensor.

In accordance with the present invention, the comparison module 38 feeds its output not only to the state-deviation estimator 46 but also to the phase reference 42, which adjusts its assumed spin frequency in such a way as to minimize a component of $E_Z$ chosen for its sensitivity to phase-reference errors. If the phase reference 42 is correct, the output of the comparison module 38 results only from sensor noise and modeling inaccuracy, so the component of $E_Z$ used by the phase reference 42 is at a minimum. If the phase reference is not correct, on the other hand, so that the comparison module 38 is de-spinning the sensor output incorrectly, part of the output of the comparison module 38 results from errors in the assumed frequency, and the component of $E_Z$ used by phase reference 42 is significant.

The effects of de-spinning errors are linearly independent of (although not orthogonal to) the results of sensor noise and modeling inaccuracy; that is, there are some directions in measurement-vector space (or, equivalently, in state-vector space) in which the effects of de-spinning errors are more pronounced, while other directions are favored by the effects of sensor noise and modeling inaccuracy. We have found that the phase reference can be locked onto the direction of gravity in the manner of a phase-locked loop if a component of $E_Z$ in a direction favored by de-spinning errors is used as a loop error signal to adjust the frequency assumed by the phase reference 42. By this means, our system establishes a vertical reference for a spinning projectile without the use of sensors other than those used to sense changes in the state of the projectile motion.

Figure 4:
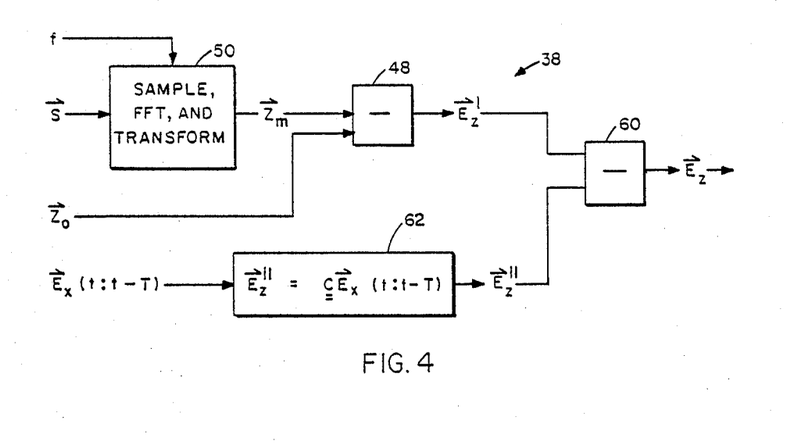
FIG. 4 is a block diagram of the comparison feature of FIG. 3.

FIG. 4 is a more detailed block diagram of the comparison module 38. In FIG. 4, a difference module 48 receives the target measurement vector $Z_0$ as well as the sensor-derived measurement vector $Z_m$ derived by a sample, FFT, and transformation module 50 from the sensor output S.

Figure 5:
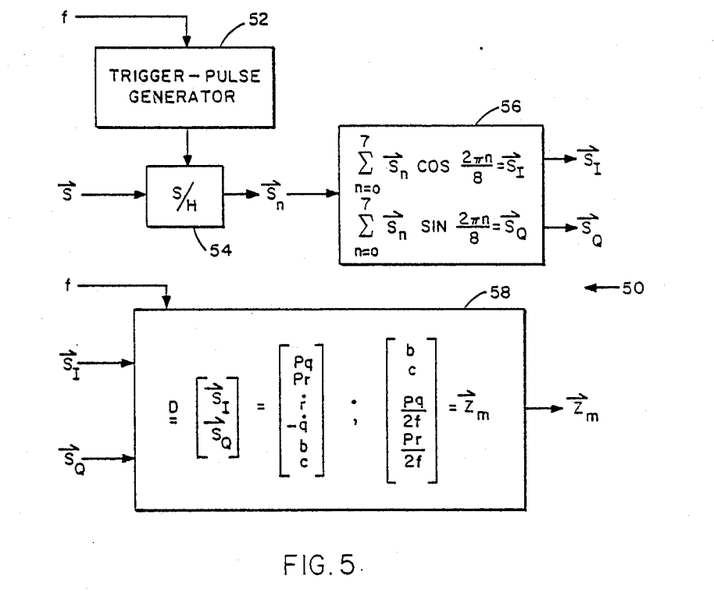
FIG. 5 is a block diagram of the sample, FFT, and transform feature of FIG. 4.

FIG. 5 shows the sample, FFT, and transformation module 50 in more detail. In FIG. 5, a trigger-pulse generator 52 receives a signal f from the phase reference 42 of FIG. 3. This signal represents the assumed spin frequency and dictates the frequency at which a trigger-pulse generator 52 is to trigger a sample-and-hold circuit 54. The roll-orientation indication that the state-deviation estimation system 34 supplies to other elements of the control system of FIG. 2 may be in the form of this output of the trigger-pulse generator 52. The trigger frequency is eight times the spin frequency; that is, a sample of the sensor output is to be taken eight times per projectile revolution. The sample-and-hold circuit 54 samples the sensor output vector S to produce a sequence of eight sensor-output samples $S_0, S_1, \ldots S_7$ for each projectile revolution, and it applies these samples to what will be referred to hereinafter as an FFT module 56.

Actually, the purpose of FFT module 56 is only to correlate the sample train $S_n$ with a sine and cosine having the spin frequency. This correlation produces one in-phase component $S_I$ and and one quadrature component $S_Q$ from each sequence produced by a single each revolution of the projectile. The FFT designation comes from the fact that the in-phase and quadrature components together constitute the real and imaginary parts of the first non-DC component of a discrete Fourier transformation of the eight samples produced during a single revolution.

The FFT module 56 feeds its output to a transformation module 58, which transforms the in-phase and quadrature components $S_I$ and $S_Q$ into quantities from which it derives the components of the measurement vector $Z_m$.

Difference module 48 of FIG. 4 determines the difference between the sensor-derived measurement vector $Z_m$ and the target measurement vector $Z_0$. This difference $E_z'$ is an adjustment vector that difference module 48 feeds to a subsequent difference module 60, which compares $E_z'$ with the output $E_z''$ of a transformation module 62.

Figure 6:
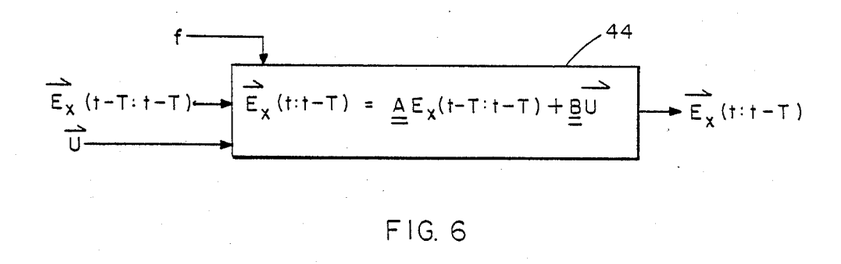
FIG. 6 is a diagram depicting the operations performed by the state-deviation predictor of FIG. 3.

Transformation module 62 receives as its input the output $E_X(t:t-T)$ of the state-deviation predictor 44 (FIG. 3). The state-deviation predictor 44 generates a predicted state deviation $E_x(t:t-T)$ by using the previously determined state deviation $E_x(t-T:t-T)$ and the force vector U as inputs to a linearized perturbation model of the projectile. FIG. 6 depicts the standard linear-system vector equation that the state-deviation predictor 44 of FIG. 3 uses to compute the predicted state deviation $E_x(t:t-T)$ that it applies to transformation module 62 of FIG. 4. FIG. 6 also shows that the state-deviation predictor 44 additionally receives the signal f from the phase reference 42. The reason for this is that the transform matrices A and B depend on the length of the period between groups of samples, which in turn depends on the frequency output of the phase reference 42. In addition to being dependent upon the sampling frequency, the matrices A and B also vary with time; the speed of the projectile is a very predictable function of time, and the transformations depend principally on this speed. Therefore, parameters from which the transformation matrices A and B are generated are stored as functions of time.

Transformation module 62 of FIG. 4 transforms this predicted state deviation into a predicted measurement-vector deviation $E_z''$ and supplies $E_z''$ as the other input to difference module 60. The output of module 60 is the performance measure $E_z$, which is a noisy indication of the difference between the mathematically predicted and actual deviations of the measurement vector from its target value.

Figure 7:
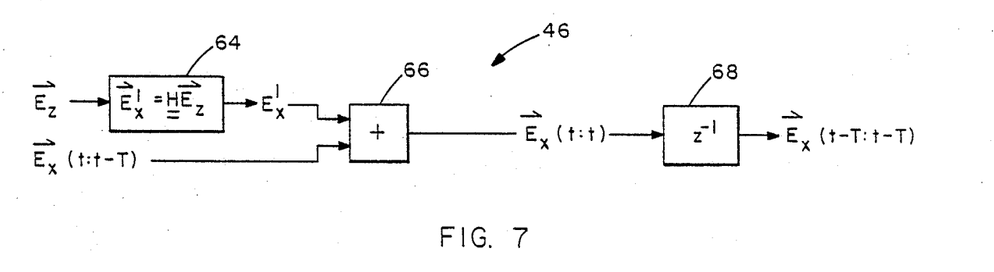
FIG. 7 is a block diagram of the state-deviation estimator of FIG. 3.

FIG. 7 depicts the manner in which the state-deviation estimator 46 of FIG. 3 uses this performance measure to compute the output state-deviation vector $E_x(t{:}t)$. The state-deviation estimator receives both the performance measure $E_z$, which is stated in terms of the measurement variables, and the predicted state deviation $E_x(t{:}t{-}T)$, which is stated in terms of the state variables. In order to map $E_z$ from measurement-vector space into state-vector space, a transformation module 64 multiplies the measurement-vector $E_z$ by a transformation matrix H to produce a vector $E_x'$. The transformation matrix H not only performs the mapping but also preferentially weights those components of $E_x'$ that result from modeling error rather than phase-reference error. The transformation matrix H is determined by the system designer from his estimates of sensor noise and modeling accuracy by using the Riccati equation and optimal-state-estimation techniques. The specific transformation matrices employed in the various transformations are time-varying and highly system dependent, so they are not shown explicitly, but methods for generating them are known to those skilled in the art. Transformations similar to those used herein are discussed in U.S. Pat. No. 4,222,272 to Mairson and in M. Athans, "The Roll and Use of the Stochastic Linear Quadrature Gaussian Problem in Control-System Design," *IEEE Trans. on Automatic Control*, Vol. AC-16 No. 6 (Dec. 1971), p. 529.

The results of this mapping and weighting are added by an adder 66 to the predicted state deviation $E_x(t{:}t{-}T)$. The multiplication by H scales the contribution from the sensors in such a manner that the output $E_x(t{:}t)$ of adder 66 can be characterized as being $E_x(t{:}t{-}T)$ modified slightly by the results of the sensors. FIG. 7 depicts $E_x(t{:}t)$ as being fed to a delay element 68, whose output is the input to the state-deviation predictor 44. This delay element 68 represents the fact that the output of summation 66 for one cycle is the input of the state-deviation predictor for the next cycle.

As was stated above, the output of the comparison module 38 represents the difference between the mathematically predicted measurement-vector deviation and the measurement-vector deviation derived from the sensor output. When the phase reference 42 does not accurately reflect the spin orientation of the projectile 10 with respect to gravity, this difference includes a component that can be used as feedback to adjust the assumed spin frequency so as to improve the relationship between the phase reference 42 and the spin orientation of the projectile 10.

Figure 8:
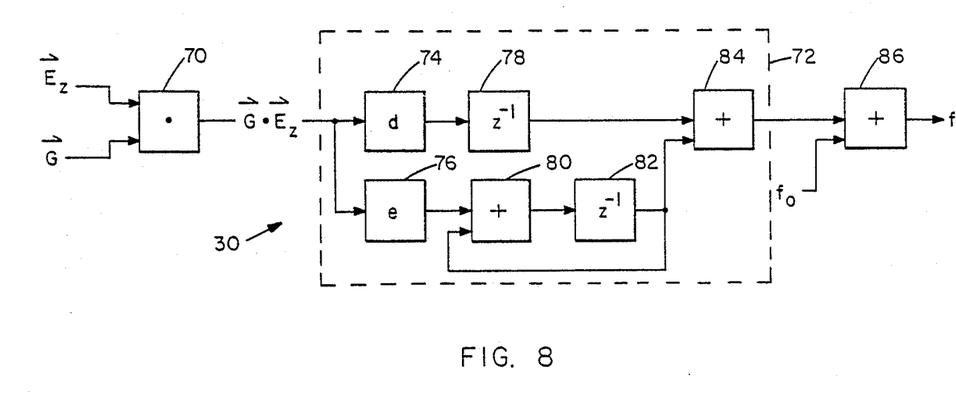
FIG. 8 is a block diagram of the phase reference of FIG. 3.

FIG. 8 depicts the phase reference 42 for performing this function. The output $E_z$ of the comparison module 38 is fed to a multiplier 70, which performs a scalar multiplication by a vector constant G whose direction in measurement-vector space is one favored by the results of inaccurate de-spinning. (Again, it should be remembered that blocks such as multiplier 70 are used here conceptually; the functions of many of these blocks are likely to be incorporated into a common microprocessor system.) The scalar product that results is a feedback quantity that is used to adjust the frequency output of the phase reference 42. For our studies, we have used a vector G with only one non-zero element, namely, the element by which the b element of $E_z$ is multiplied. That is, we have used a value proportional to the horizontal-acceleration element of $E_z$. However, other components of $E_z$ can be used in this and other situations.

Module 72 in FIG. 8 provides proportional-plus-integral processing of the feedback quantity that issues from block 70. This module 72 includes two multiplier blocks 74 and 76, which multiply by factors d and e, respectively. A delay module 78 delays the output of multiplier 74 by one cycle, while an addition module 80 adds the output of multiplier 76 to the output of a delay circuit 82, whose input in turn is the output of adder 80. The outputs of the two delays 78 and 82 are applied as inputs to a further adder 84, whose output is applied as one input to yet another adder 86. The other input to adder 86 is a constant $f_0$, which is the nominal spin frequency—say, 200 Hz—of the projectile 10.

This arrangement results in proportional-plus-integral feedback in the phase-locked loop. That is, the correction provided by this arrangement is proportional to the present output of multiplier 70 plus a further factor proportional to the sum of its previous outputs. Consequently, if a non-zero output of multiplier 70 is repeatedly present, the output of delay 82 increases steadily, increasing the adjustment to $\underline{f}$ to drive the output of multiplier 70 essentially to zero, although it typically will not be exactly zero even when the phase-locked loop is locked on, since the components of $E_z$ that result from modeling error are not completely orthogonal to G.

Together with the multiplication factors $\underline{d}$ and $\underline{e}$, vector F determines the loop gain of the phase-locked loop. To arrive at appropriate values of G, $\underline{d}$, and $\underline{e}$, a conventional z-transform pole-zero analysis is performed on the phase-reference loop alone with the assumption that there is no sensor noise or modeling error. Similarly, the H matrix of FIG. 7 is determined according to the Riccati equation, as was mentioned above, with the phase reference assumed to be accurate. That is, feedback parameters for the upper and lower loops in FIG. 3 are initially determined individually so that conventional linear-systems design techniques can be employed. The resultant values of H, G, $\underline{d}$, and $\underline{e}$ are then used as starting points in simulations, which must be resorted to when errors in both loops are assumed and nonlinear effects therefore result. In the simulations, the values of H, G, $\underline{d}$, and $\underline{e}$ are adjusted to determine what adjustments in these values will improve the "robustness" of the system—i.e, to determine what adjustments maximize the capture range, the region in which the system remains stable, and the speed of the lock-on process.

In operation, the state-deviation predictor 44 and the phase reference 42 generally have largely incorrect information when the projectile 10 begins its flight; they have not yet received information from the sensor array 36. Accordingly, the control system of FIG. 2 does not immediately begin to operate the canards in response to the output of system 34. Instead, it waits for a short period of time until the state-deviation estimator 44, comparison module 38, phase reference 42, and state-deviation module have completed a number of cycles of operation.

During this initial period, the comparison module repeatedly determines the difference $E_Z$ between measured and mathematically predicted values of the measurement vector, as was explained above. $E_z$ includes components that result from sensor noise, from the phase error, and from modeling error. The weighting used in the feedback of $E_z$ to the phase reference 42 is different from that used by the state-deviation estimator 46 to generate feedback for the state-deviation predictor 44, and the two weighting processes tend to discriminate between the two components. As a result, the phase reference 42 is adjusted to minimize the error components caused by phase error, and it tends to lock on to the proper frequency within the initial period. Similarly, the estimate generated by the state-deviation predictor 44 becomes accurate enough within the initial period that the output of the state-deviation estimator can be used as a basis on which to control the canards. Accordingly, the remainder of the control system then begins to use the output of the deviation-estimation system 34 when the initial period is over.

Clearly, the present invention offers significant advantages over systems that employ, for instance, sun sensors to determine the spin phase of the projectile. The system of the present invention does not have to be provided with the time of day, latitude, and longitude, and it can be used in cloudy weather and at night. Thus, the present invention constitutes a significant advance in the art.

What is claimed as new and desired to be secured by Letters Patent of the United States is:

1. In a projectile for executing ballistic motion under the influence of gravity, a guidance system for guiding the projectile in accordance with a target-vector indication supplied thereto, the guidance system comprising:
    A. a movable control surface on the projectile for affecting the motion of the projectile in accordance with the orientation of the control surface;
    B. a sensor array for sensing enough physical quantities to determine predetermined kinematic variables if the spin orientation of the platform with respect to gravity is known and for generating a sensor outlet representative of the sensed quantities;
    C. computation means, connected to receive the sensor output and adapted for reception of the target-vector indication, for:
        (i) establishing a phase reference representing an estimate of the spin phase of the platform with respect to gravity;
        (ii) employing a mathematical model of the platform to calculate a predicted state deviation from an indication of the previous state deviation and to produce a predicted-deviation indication that represents the predicted state deviation;
        (iii) producing from the sensor output, the predicted-deviation indication, and the target-vector indication a difference output representing the difference between (a) the deviation, from the values indicated by the target-vector indication, of the kinematic variables derived from the sensor array in accordance with the phase reference and (b) the deviation, derived from the predicted-deviation indication, of the kinematic variables from the values indicated by the target vector;
        (iv) generating from the predicted-deviation indication and the difference output an estimated-deviation output consisting of the predicted-deviation indication adjusted in accordance with the difference output to represent the new deviation in the state of the platform and using the estimated-deviation output as the indication of the previous state deviation in the next calculation of the predicted state deviation; and
        (v) minimizing any misalignment of the phase reference with the direction of gravity by adjusting the phase reference in accordance with a component of the difference indication that results from misalignment of the phase reference with the direction of gravity, whereby the phase reference tends to be alignment with the force of gravity without the need for additional sensors; and
    D. a direction-control system for moving the control surface so as to control its orientation in accordance with the estimated deviation output.

2. An apparatus as defined in claim 1 wherein the computation means:
    A. produces correlation values by correlating successive periods of the sensor output with the phase reference;
    B. generates a measurement vector by subjecting the correlation values to a transformation that results in a measurement vector having the proper values of the kinematic variables in the absence of sensor noise if the phase reference correctly represents the phase of rotation the platform with respect to gravity; and
    C. generates the difference output by subtracting from the measurement vector the target vector and the deviation in the kinematic variables as derived from the predicted-deviation indication.

3. An apparatus as defined in claim 2 wherein:
    A. the kinematic variables are different from the state variables in the predicted-deviation indication; and
    B. the computation means converts the predicted-deviation indication to the kinematic variables derived therefrom before subtracting the derived kinematic variables from the measurement vector.

4. An apparatus as defined in claim 3 wherein the computation means produces a first difference by subtracting the target vector from the measurement vector and subtracts from the first difference the kinematic variables as derived from the predicted deviation.

5. An apparatus as defined in claim 4 wherein:
    A. the kinematic variables are the translational accelerations in two axes perpendicular to the platform trajectory and rotational velocities about those two axes; and
    B. the predicted deviation is the deviation in a state whose elements are the translational velocities in two axes perpendicular to the platform trajectory and the angular velocities about those two axes.

6. An apparatus as defined in claim 3 wherein:
    A. the kinematic variables are the translational accelerations in two axes perpendicular to the platform trajectory and the rotational velocities about those two axes; and
    B. the predicted deviation is the deviation in a state whose elements are the translational velocities in two axes perpendicular to the platform trajectory and the angular velocities about those two axes.

7. An apparatus as defined in claim 2 wherein:
   A. the kinematic variables are the translational acceleration along a first axis perpendicular to gravity and to the platform trajectory, the translational acceleration along a second axis perpendicular to the first axis and to the platform trajectory, and the rotational velocities about the first and second axes; and
   B. the computation means adjusts the phae reference in accordance with the element of the difference indication that corresponds to the translational acceleration along the first axis.

8. An apparatus as defined in claim 7 wherein the predicted deviation is the deviation in a state whose elements are the translational velocities in two axes perpendicular to the platform trajectory and the angular velocities about those two axes.

9. An apparatus as defined in claim 1 wherein the computation means:
   A. produces an adjustment vector by converting the difference output to a state deviation and weighting it by a predetermined amount in comparison with the predicted deviation; and
   B. adds the adjustment vector to the predicted deviation to produce the estimated-deviation output.

10. An apparatus as defined in claim 9 wherein the computation means weights the difference output in a direction favored by modeling errors.

11. An apparatus as defined in claim 10 wherein:
    A. the kinematic variables are the translational acceleration along a first axis perpendicular to gravity and to the platform trajectory, the translational acceleration along a second axis perpendicular to the first axis and to the platform trajectory, and the angular velocities about the first and second axes; and
    B. the computation means adjusts the phase reference in accordance with the element of the difference indication corresponding to the translational acceleration along the first axis.

12. An apparatus as defined in claim 1 wherein:
    A. the kinematic variables are the translational accelerations in two axes perpendicular to the platform trajectory and rotational velocities about those two axes; and
    B. the predicted deviation is the deviation in a state whose elements are the translational velocities in two axes perpendicular to the platform trajectory and the angular velocities about those two axes.

13. An apparatus as defined in claim 1 wherein:
    A. the kinematic variables are the translational acceleration along a first axis perpendicular to gravity and to the platform trajectory, the translational acceleration along a second axis perpendicular to the first axis and to the platform trajectory, and the rotational velocities about the first and second axes; and
    B. the computation means adjusts the phase reference in accordance with the element of the difference indication that corresponds to the translational acceleration along the first axis.

14. An apparatus as defined in claim 13 wherein the predicted deviation is the deviation in a state whose elements are the translational velocities in two axes perpendicular to the platform trajectory and the angular velocities about those two axes.

15. For guiding a projectile that executes ballistic motion under the influence of gravity and includes a sensor array for sensing, and generating a sensor output representative of, enough physical quantities to determine predetermined kinematic variables if the spin orientation of the platform with respect to gravity is known and further includes moveable control surfaces for affecting the motion of the projectile in accordance with the orientation of the control surface, the method comprising the steps of:
    A. establishing a phase reference representing an estimate of the spin phase of the platform with respect to gravity;
    B. employing a mathematical model of the platform to calculate a predicted state deviation from an indication of the previous state deviation and to produce a predicted-deviation indication that represents the predicted state deviation;
    C. producing from the sensor output, the predicted-deviation indication, and the target-vector indication a difference output representing the difference between (a) the deviation, from the values indicated by the target-vector indication, of the kinematic variables derived from the sensor array in accordance with the phase reference and (b) the deviation, derived from the predicted-deviation indication, of the kinematic variables from the values indicated by the target vector;
    D. generating from the predicted-deviation indication and the difference output an estimated-deviation output consisting of the predicted-deviation indication adjusted in accordance with the difference output to represent the new deviation in the state of the platform and using the estimated-deviation output as the indication of the previous state deviation in the next calculation of the predicted state deviation;
    E. minimizing any misalignment of the phase reference with the direction of gravity by adjusting the phase reference in accordance with a component of the difference indication that results from misalignment of the phase reference with the direction of gravity, whereby the phase reference tends to be in alignment with the force of gravity without the need for additional sensors; and
    F. moving the control surface so as to control the orientation thereof in accordance with the estimated deviation output.

16. A method as defined in claim 15 wherein the step of producing the difference output includes the steps of:
    A. producing correlation values by correlating successive periods of the sensor output with the phase reference;
    B. generating a measurement vector by subjecting the correlation values to a transformation that results in a measurement vector having the proper values of the kinematic variables in the absence of sensor noise if the phase reference correctly represents the phase of rotation of the platform with respect to gravity; and
    C. generating the difference output by subtracting from the measurement vector the target vector and the deviation in the kinematic variables as derived from the predicted-deviation indication.

17. A method as defined in claim 16 wherein the kinematic variables are different from the state variables in the predicted deviation indication and the step of generating the difference output comprises converting the predicted-deviation indication to the kinematic variables derived therefrom before subtracting the derived kinematic variables from the measurement vector.

18. A method as defined in claim 17 wherein the step of generating the difference output includes producing a first difference by subtracting the target vector from the measurement vector and subtracting from the difference the kinematic variables as derived from the predicted deviation.

19. A method as defined in claim 18 wherein:
A. the kinematic variables are the translational accelerations in two axes perpendicular to the platform trajectory and the rotational velocities about those two axes; and
B. the predicted deviation is the deviation in the state whose elements are the translational velocities in two axes perpendicular to the platform trajectory and the angular velocities about those two axes.

20. A method as defined in claim 17 wherein:
A. the kinematic variables are the translational accelerations in two axes perpendicular to the platform trajectory and the rotational velocities about those two axes; and
B. the predicted deviation is the deviation in the state whose elements are the translational velocities in two axes perpendicular to the platform trajectory and the angular velocities about those two axes.

21. A method as defined in claim 16 wherein:
A. the kinematic variables are the translational acceleration along a first axis perpendicular to gravity and to the platform trajectory, the translational acceleration along a second axis perpendicular to the first axis and to the platform trajectory, and the rotational velocities about the first and second axes; and
B. the step of minimizing phase-reference misalignment includes adjusting the phase reference in accordance with the element of the difference indication that corresponds to the translational acceleration along the first axis.

22. A method as defined in claim 21 wherein the predicted deviation is the deviation in a state whose elements are the translational velocities in two axes perpendicular to the platform trajectory and the angular velocity about those two axes.

23. A method as defined in claim 15 wherein the step of generating an estimated-deviation output comprises the steps of:
A. producing an adjustment vector by converting the difference output to a state deviation and weighting it by a predetermined amount in comparison with the predicted deviation; and
B. adding the adjustment vector to the predicted deviation to produce the estimated-deviation output.

24. A method as defined in claim 23 wherein the step of producing an adjustment vector includes weighting the difference output in a direction favored by modeling errors.

25. A method as defined in claim 24 wherein:
A. the kinematic variables are the translational acceleration along a first axis perpendicular to gravity and to the platform trajectory, the translational acceleration along a second axis perpendicular to the first axis and to the platform trajectory, and the angular velocities about the first and second axes; and
B. the step of minimizing phase-reference misalignment includes adjusting the phase reference in accordance with the element of the difference indication corresponding to the translational acceleration along the first axis.

26. A method as defined in claim 15 wherein:
A. the kinematic variables are the translational accelerations in two axes perpendicular to the platform trajectory and the rotational velocities about those two axes; and
B. the predicted deviation is the deviation in a state whose elements are the translational velocities in two axes perpendicular to the platform trajectory and the angular velocities about those two axes.

27. A method as defined in claim 15 wherein:
A. the kinematic variables are the translational acceleration along a first axis perpendicular to gravity and to the platform trajectory, the translational acceleration along a second axis perpendicular to the first axis and to the platform trajectory, and the angular velocities about the first and second axes; and
B. the step of minimizing phase-reference misalignment includes adjusting the phase reference in accordance with the element of the difference indication corresponding to the translational acceleration along the first axes.

28. A method as defined in claim 27 wherein the predicted deviation is the deviation in a state whose elements are the translation velocities in two axes perpendicular to the platform trajectory and the angular velocities about those two axes.

* * * * *